June 21, 1927.

H. G. HAYS

STAFF SUPPORT

Filed Oct. 6, 1924

1,632,965

Harvey G. Hays
Inventor

Attorney.

Patented June 21, 1927.

1,632,965

UNITED STATES PATENT OFFICE.

HARVEY G. HAYS, OF COLUMBUS, OHIO.

STAFF SUPPORT.

Application filed October 6, 1924. Serial No. 741,846.

My invention relates to a staff support and has to do particularly with the provision of a simple means for supporting a staff, or pole, at any desired location in the ground or other suitable surface whereby the staff or support, or both, may be placed or removed at will.

Occasions arise when it becomes desirable to decorate a city, or portions of a city, particularly a residential section, and ofttimes the display of flags is particularly appropriate. Such decoration or display of flags, however, is difficult, especially in a residential section of a city because of the lack of any means for properly supporting a flag.

To display the desired decorations or flags, it has been necessary to mutilate the home by fastening such decorations thereto, or to mutilate the lawn or other surface around the home by driving poles therein for supporting the decorations or flags.

One of the objects of my invention is the provision of a simple and inexpensive means, whereby decorations such as flags and the like may be quickly and easily displayed, on proper occasions, on the lawn or other surface about the home, without mutilating or causing a permanent fracture to the lawn or other surface, and whereby such decorations may be easily removed after use.

Another object of my invention is the provision of a staff support which may be inserted into the ground at any desired location, and which will support a staff while so inserted into the ground, and which may be removed when it is desired to take down the decorations.

Another object of my invention is the provision of a support which will prevent the staff support from assuming an angular position relative to the ground because of a lateral strain thereon.

Another object of my invention is the provision of a support which will automatically tend to assume a vertical position upon being inserted into the ground.

A further object of my invention is the provision of a spear member, adapted to be inserted into the ground, and which will not cause a permanent fracture to the ground when removed therefrom.

A further object of my invention is the provision of a support having a member adapted to be pressed against the surface of the ground, which member is of open construction, and will not destroy or kill the grass thereunder, when such support is inserted into the ground.

Still another object of my invention is the provision of a support which may be easily and quickly loosened in the ground without fracturing the ground, prior to removal therefrom, which loosening makes possible a quick and easy removal of the support from the ground.

Various other features of my invention will be brought out in the claims appended hereto. The various objects of my invention are preferably obtained by the structures illustrated in the drawings where similar characters of reference designate corresponding parts and wherein;

Figure 1:
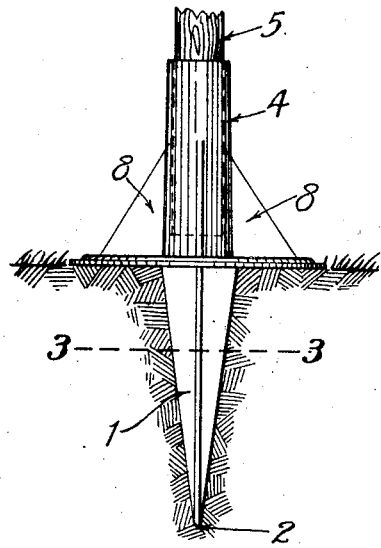
Figure 1 is a side elevation of my novel support showing the manner in which it is inserted into the ground, and showing the member adapted to rest upon the surface of the ground.
Figure 2:
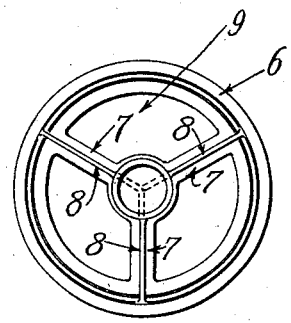
Figure 2 is a plan view, showing the open construction of the member which is adapted to rest upon the surface of the ground.
Figure 3:
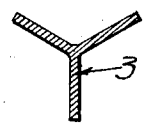
Figure 3 is an enlarged section of the spear member of my staff support, taken on line 3—3 of Figure 1.

In the drawings, and referring particularly to Figures 1, 2 and 3, the spear member of my support is designated by the reference numeral 1. This spear member is tapered throughout its length, and terminates in a point 2. The spear member is provided with three outstanding vanes 3, extending throughout its length, as is shown in Figure 3.

Extending oppositely from the spear member 1, and preferably integral therewith, is a socket member 4. The member 4 is designed for the reception of a staff 5. It is to be understood that the socket member may not be formed integral with the spear member, but may have a detachable connection therewith. The socket and spear members may be provided with screw threads, whereby sockets of various sizes may be used to accommodate poles of various sizes.

Encircling the members 1 and 4, as shown in Figure 1, is the member 6, which is constructed in the form of a ring. The member 6 is rigidly associated with the members 1 and 4 by means of the braces 7, which braces 7 have upstanding angular wings 8 which are securely associated with the socket member 4, and which give an added degree of strength to the association of the ring 6 with the members 1 and 4. The member 6 is designed to be pressed against the surface of the ground when the socket is in use. This member is of open construction having open places 9. In thus providing the member 6 of open construction, the area of ground against which the member is pressed is reduced to a minimum, thereby reducing to a minimum the grass which may be mutilated or destroyed by the member pressing against the grass.

The wings 8 extending from the braces 7 to the socket 4, and which provide for a rigid and strong connection, between the ring member 6 and the spear and socket member, additionally provide surfaces against which pressure may be brought, for loosening the spear in the ground prior to removal therefrom. In removing the socket from the ground, one may strike the side of one of the members 8 with a hammer or other suitable device, or may kick the member with his heel, thereby causing a slight rotation of the support as a whole, and the spear member within the ground. The spear member is thus loosened, and its removal from the ground can be easily and quickly accomplished without causing a permanent fracture to the ground and without pulling any of the sod out of place.

In use, my support may be inserted into the ground in any desired location, such as in the lawn around a residence. The spear is inserted into the ground, until the ring member comes into contact with the surface of the ground. The staff of the flag or other decoration, is placed within the socket 4, and allowed to remain as long as desired. Should a lateral strain come against the staff, the member 6 will press against the surface of the ground, and the spear member 1 will press laterally, throughout its length, against the ground surrounding the same. Thus the two members 6 and 1 cooperate in maintaining the staff in upright position. When it is desired to remove the decoration, the staff 5 may be removed from the socket allowing the support to remain, or the staff and support may both be removed.

Furthermore, in the use of my device, the action against the surface of the ground of the member 6 in my preferred form, and the members 12 of my modified form, is such as to straighten the support upon insertion into the ground, and cause the socket, and staff therein to assume a vertical position. Thus, should the spear member be inserted into the ground at an angle, the surface contacting member, upon coming into contact with the surface of the ground, will cause the support to tend to assume an upright position.

I have provided a staff support having a spear member adapted for insertion into the ground, which member is so designed that the insertion of the member into the ground and its removal therefrom, will not cause a permanent fracture to the ground. This is accomplished by providing the spear member with longitudinally extending vanes. When the spear member is removed from the ground, there appears in the ground slots made by the vanes, which slots quickly come together whereby the ground readily assumes its original and unmarred surface.

It is important to so design the spear member so that the sod or ground immediately surrounding the member, will not cling to the member, when the member is withdrawn from the ground, whereby a permanent fracture to the surface of the ground would result. This may be accomplished by providing the angles between the vanes of sufficient size, so as to eliminate the possibility of the sod or ground from becoming lodged in the angle. In addition, the angles may be provided, if desired, with rounded apexes, which would further assist in eliminating the possibility of sod or ground from becoming lodged in the angle.

I have described my device as being a support for staffs, particularly in connection with the supporting of flags, or other decorations. It will be understood, however, that my device is not to be limited to such use, but that it may be used, for supporting staffs or poles for various purposes such as supporting poles or standards in temporarily roping off areas, such as roadways or footpaths, or for the support of standards for athletic purposes and the like.

Having thus described my invention, I claim:

1. In a staff support, a spear adapted for insertion into the ground, a socket adapted to receive a staff, and an open constructed member attached to said socket and spaced therefrom for contact with the surface of the ground, said member serving to cause the support to tend to assume an upright position upon insertion into the ground.

2. In a staff support, a spear adapted for insertion into the ground, a socket adapted to receive a staff, and an open constructed member attached to said socket of greater circumference than the base of said socket for contacting with the surface of the ground, said member serving to cause the support to tend to assume an upright position upon insertion into the ground.

3. In a staff support, a tapered spear provided with outwardly extending vanes adapted for insertion into the ground, a socket for holding a staff, said socket extending oppositely from said spear, an open constructed ring of greater circumference than the base of said socket formed centrally of said spear and socket, and adapted to rest upon the surface of the ground, and outstanding braces extending from said ring to said socket, for supporting said ring, said braces serving as means for loosening said spear prior to the removal thereof from the ground.

In testimony whereof I hereby affix my signature.

HARVEY G. HAYS.